United States Patent [19]

Benjamin et al.

[11] 4,021,132
[45] May 3, 1977

[54] FLOATING TOOL HOLDER

[75] Inventors: Milton Lloyd Benjamin; Wilbur Nelson Miles, both of Chagrin Falls, Ohio

[73] Assignee: Erickson Tool Company, Solon, Ohio

[22] Filed: May 19, 1976

[21] Appl. No.: 688,090

[52] U.S. Cl. .............................. 408/127; 279/16; 279/81

[51] Int. Cl.² .................... B23B 39/10; B23B 5/22; B23B 5/34

[58] Field of Search ................. 408/127; 279/1, 16, 279/81

[56] References Cited

UNITED STATES PATENTS

| | | | |
|---|---|---|---|
| 2,981,544 | 4/1961 | Better ................................. | 279/16 |
| 3,454,283 | 7/1969 | Benjamin et al. ................... | 279/16 |
| 3,734,517 | 5/1973 | Benjamin ............................. | 279/81 |
| 3,740,063 | 6/1973 | Smith ................................... | 279/16 |
| 3,801,115 | 4/1974 | Benjamin ............................. | 279/81 |
| 3,945,751 | 3/1976 | Johnson .............................. | 408/127 |

*Primary Examiner*—Harrison L. Hinson
*Attorney, Agent, or Firm*—Donnelly, Maky, Renner & Otto

[57] ABSTRACT

A floating tool holder for a reamer or like tool characterized in that a shank member with respect to which a tool drive member has a floating drive connection has a centralizing pin fixed therewithin which provides a spring centering device to yieldably position said drive member coaxially of said shank member, and which axially retains said drive member for lateral floating movement without axial play.

10 Claims, 3 Drawing Figures

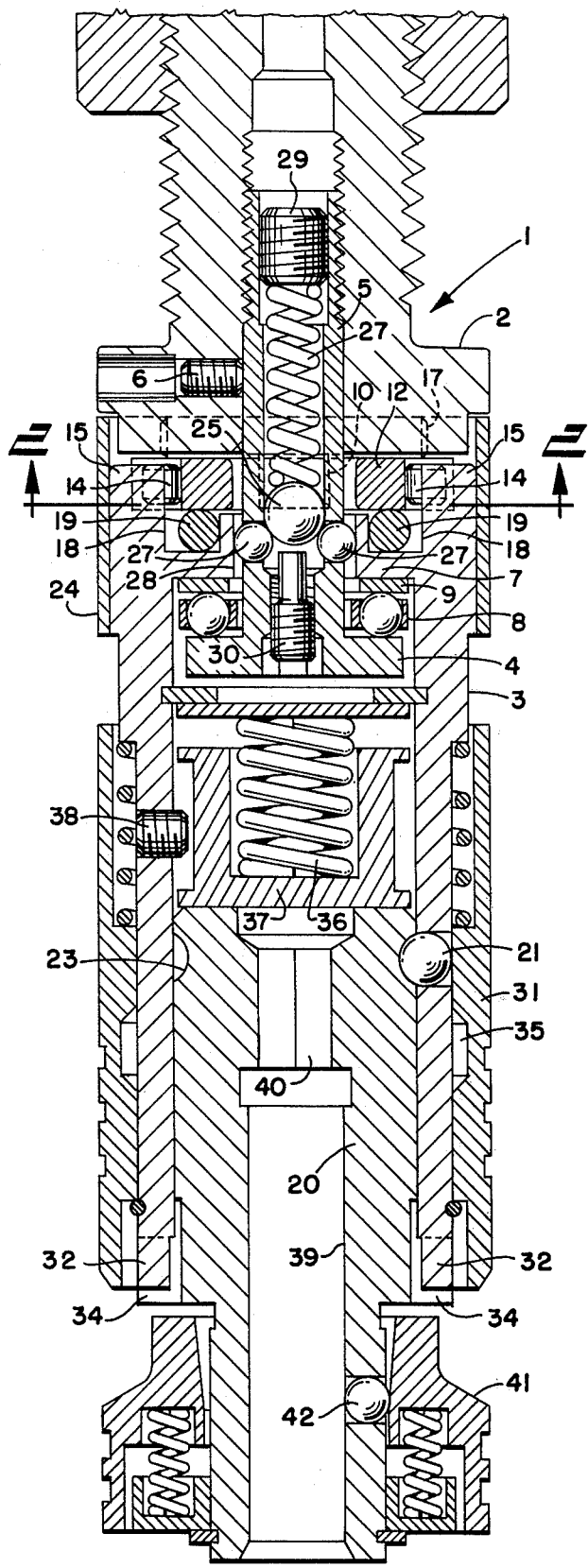
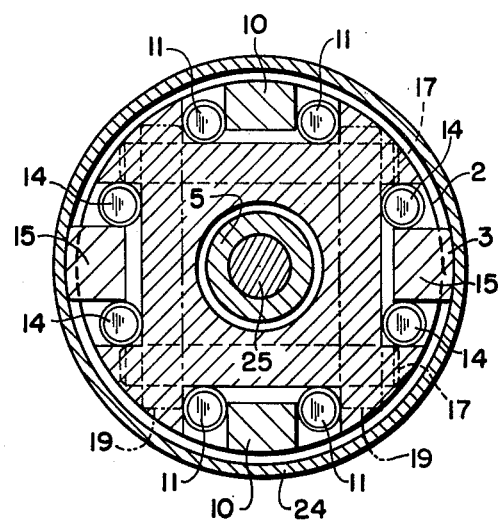
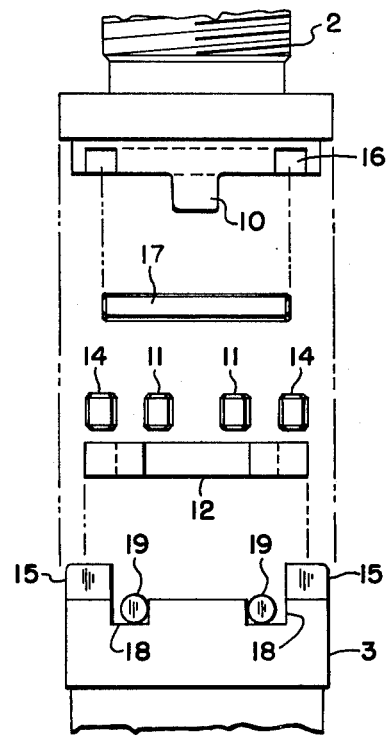

FLOATING TOOL HOLDER

BACKGROUND OF THE INVENTION

Known floating tool holders as disclosed, for example, in the M. L. Benjamin et al U.S. Pat. Nos. 3,421,770 and 3,454,283 are generally of relatively large diameter because the axial retainer for the floating connection is in the form of a threaded cap on the shank member surrounding the floating connection and having an in-turned flange overlying a radially outturned flange of the floating drive member.

SUMMARY OF THE INVENTION

The present invention provides a floating tool holder which is of compact lateral size, which has a simple and accurate spring centering means to yieldably center the floating drive member with respect to the shank member when a tool held by said drive member is free of a workpiece, which has a spring-biased ejector for ejecting a tool mounting adaptor and tool held thereby from the floating drive member when an actuating sleeve of the latter is shifted to disconnect position and for latching said sleeve in disconnect position, and which has the drive means between the floating member and the tool mounting adaptor adjacent the axially outer end of the floating member to facilitate insertion of the tool mounting adaptor into the floating member in driving relation thereto.

Other objects and advantages will appear from the ensuing description.

BRIEF DESCRIPTION OF THE DRAWING

FIG. 1 is a longitudinal central cross-section view of a tool holder embodying the present invention;

FIG. 2 is a cross-section view as viewed along the line 2—2, FIG. 1; and

FIG. 3 is an exploded elevation view of the floating drive connection between the shank member and the tool drive member.

DETAILED DESCRIPTION OF A PREFERRED EMBODIMENT

The floating tool holder 1 herein shown comprises a shank member 2 which is adapted to be driven by the spindle of a machine tool and for purposes of illustration the shank member 2 may be of the type in common use in automotive tooling as shown, for example, in M. L. Benjamin U.S. Pat. Nos. 3,734,517 and 3,801,115. It is to be understood that other well-known types of straight or tapered shanks may be employed.

Secured to the shank member 2 for rotation therewith and for lateral floating movement is a floating tool drive member 3 which is axially fixed with respect to the shank member 2 by means of the head 4 of a tubular retainer 5 which has threaded engagement in the shank member 2 and which is locked by the set screw 6. Between the head 4 of the retainer 5 and an inturned flange 7 of the floating drive member 3 is a ball bearing asssembly 8 and a thrust washer 9.

The floating drive connection herein is generally similar to that shown in M. L. Benjamin et al U.S. Pat. No. 3,454,283, and comprises a pair of diametrically opposite lugs 10 which, through axial rollers 11 transmit torque to a drive plate 12. The drive plate 12 transmits torque through axial rollers 14 to a pair of diametrically opposite lugs 15 on the floating drive member 3 which is disposed at right angles to the driving lugs 10 of the shank member 2. The shank member 2 has a pair of parallel grooves 16 in which thrust rollers 17 fit with clearance, said rollers 7 being engaged with the upper plane face of the drive plate 12. The floating drive member 3 is formed with a similar pair of grooves 18 at right angles to the grooves 16 in the shank member 2 and disposed in said grooves 18 with clearance are a pair of thrust rollers 19 disposed at right angles to the rollers 17, said rollers 19 being engaged with the bottom plane face of the drive plate 12.

When the retainer 5 is installed, it is tightened to eliminate axial play between the shank member 2 and the floating drive member 3 but, as evident, the floating drive member 3 may be freely shifted laterally in perpendicularly related paths to accommodate any eccentricity between the axis of the shank member 2 and a workpiece which is to be operated upon by a tool (not shown) mounted in the tool mounting adaptor 20, said adaptor being secured to the floating drive member 3 by means of the balls 21 engaged in a groove 23.

As viewed in FIG. 2, the floating drive member 3 may shift horizontally and vertically as permitted by the clearances between the thrust rollers 19 and 17 and their respective grooves 18 and 16 and between the bottoms of the grooves of the drive plate 12 and the inner faces of the drive lugs 15 and 10. Regardless of the position of the floating drive member 3, the rotation of shank member 2 will effect positive driving of floating drive member 3 through the drive plate 12 and the axial rollers 11 and 14 and lugs 10 and 15. The rollers 11, 14, 17 and 19 are held from falling out by the sleeve 24 which may be a press fit on floating drive member 3.

For automatically centering the floating drive member 3 with respect to the shank member 2, a ball 25 biased by spring 26 has a close sliding fit in the central bore of the retainer 5 and has camming engagement with a plurality of balls 27, preferably four in number, to urge the balls 27 radially outward into engagement with the central bore 28 of the floating drive member 3. The force of spring 26 is adjusted by screw 29 so that the radial force component on the balls 27 overcomes friction in the floating connection to center the drive member 3 with respect to the shank member 2 and overcomes the weight of the drive member 3, mounting adaptor 20, and tool when the tool holder 1 axis is in horizontal position. When the floating drive member 3 is shifted laterally such movement will be yieldably permitted by the inward movement of a ball or balls 27 on one side moving against the center ball 25 and camming the latter upwardly against the spring 26. A restrictor pin 30 is provided to limit inward movement of the balls 27 not engaged by the lifted center ball 25 to assure an adequate cam angle when ball 25 moves down to center the drive member 3.

Referring now to the tool mounting adaptor 20, it has, as aforesaid, a peripheral groove 23 in which the balls 21 are engaged when the spring-biased actuating sleeve 31 is in the position shown in FIG. 1. In that position of the tool mounting adaptor 20 the axial diametrically opposite lugs 32 at the lower end of the floating drive member 3 are engaged in the grooves 34 in the flange of the tool mounting adaptor 20 thus to form a positive drive connection.

When the actuating sleeve 31 is moved upwardly against spring pressure, the internal groove 35 will be aligned with the balls 21 to free the balls 21 from groove 23 whereby the pressure of spring 36 on the ejector 37 will force the tool mounting adaptor 20 downwardly out of the floating drive member 3 to disengage the positive drive connection 32-34 for complete withdrawal of the tool mounting adaptor 20 and a tool therein from the floating drive member 3. A stop screw 38 is provided to limit the movement of the ejector 37 to a position whereat it prevents inward movement of the balls 21 whereby the actuator sleeve 31 is retained in its upper disconnect position. Accordingly, it is a simple one-hand operation to insert a tool mounting adaptor 20 into the floating drive member 3 simply by axially thrusting it into the floating drive member 3 and when the upper end of the tool mounting adaptor 20 contacts the ejector 37, the latter will be moved out of engagement with the balls 21. When the groove 23 is opposite the balls 21, the actuator sleeve 31 will be moved to the position shown in FIG. 1 to lock the tool mounting adaptor 20 in the floating drive member 3.

The tool mounting adaptor 20 has a bore 39 which is a close fit on the shank of a tool such as a reamer and said bore 39 terminates in a square hole 40 for driving engagement with the tang of the tool. To firmly secure the tool in the tool mounting adaptor a spring-actuated cam sleeve 41 is operative to cam the balls 42 into locking engagement with the shank of the tool and, of course, the tool may be released by moving the sleeve 41 downwardly to release the compressive loading on the balls 42.

For a more complete discussion of quick-disconnect ball connections of the type referred to, reference may be had to the M. L. Benjamin et al U.S. Pat. No. 3,529,842.

When a tool such as a reamer is engaged with a drilled hole in a workpiece, if there is any slight eccentricity of the shank member 2 with respect to the axis of the drilled hole, the tool, the tool mounting adaptor 20, and the floating drive member 3 assembly may shift laterally in any direction as permitted by the floating drive connection.

We claim:

1. A floating tool holder comprising a shank member; a tool supporting member; a drive plate assembly between said member for transmitting torque from said shank member to said tool supporting member while permitting lateral floating movement of said tool supporting member in a perpendicularly-related directions; and a retainer secured centrally within said shank member and having a radially outwardly extending flange which radially overlaps a radially inwardly extending flange of said supporting member to retain said members against axial separation.

2. The floating tool holder of claim 1 wherein antifriction bearing means is interposed between said flanges.

3. The floating tool holder of claim 1 wherein perpendicularly related pairs of parallel axial thrust rollers are respectively engaged between parallel plane faces on said shank member and on one side of said drive plate and between parallel plane faces on said tool supporting member and on the other side of said drive plate.

4. The floating tool holder of claim 1 wherein said members are perpendicularly-related diametrically opposite lugs extending axially between respective diametrically opposite grooves in said drive plates; and wherein axially extending rollers are engaged between opposite side of said lugs and the opposite sides of said grooves to transmit torque from said shank member to said tool supporting member.

5. The floating tool holder of claim 1 wherein spring centering means in said retainer yieldably retains said members in coaxial relation.

6. The floating tool holder of claim 5 wherein said spring centering means comprises a tubular portion of said retainer in which a spring-biased cam member is axially slidable; said tool supporting member having a central bore surrounding said tubular portion; and centering members extending radially through said tubular portion and yieldably cammed outwardly by said cam member into engagement with said central bore.

7. The floating tool holder of claim 6 wherein said cam member comprises a ball and wherein said centering members comprise a circular series of balls extending through radial openings in said tubular portion.

8. The floating tool holder of claim 1 wherein said tool supporting member has a coaxial tubular portion terminating in drive means at its open end; wherein a tool mounting adaptor axially inserted into said tubular portion has complemental drive means engaged with said drive means at the open end of said tool supporting member; and wherein said tubular portion between said open end and said drive plate assembly has means for axially releasably holding said tool mounting adaptor in said tool supporting member.

9. The floating tool holder of claim 8 wherein a spring-biased ejector within said tubular portion bears on the end of said tool mounting adapter and is operative to eject the latter from said tool supporting member upon release thereof by said means.

10. The floating tool holder of claim 9 wherein said means comprises a plurality of balls radially movably carried by said tubular portion for movement into and out of engagement with a peripheral groove in said tool mounting adaptor; wherein a spring-biased actuating sleeve on said tubular portion has an internal groove which in one position of said sleeve is aligned with said balls to permit spring-biased movement of said sleeve to cam said balls into said adapter groove to lock said adaptor in said tool supporting member; and wherein said ejector after ejection of said adapter has a stop position which retains said balls in said internal groove thereby to latch said sleeve in adaptor releasing and receiving position.

* * * * *